United States Patent
M S et al.

(10) Patent No.: US 12,142,011 B2
(45) Date of Patent: Nov. 12, 2024

(54) SYSTEM AND A METHOD FOR CALCULATING A CAMERA LENS OFFSET DEVIATION

(71) Applicant: E-CON SYSTEMS INDIA PRIVATE LIMITED, Chennai (IN)

(72) Inventors: Senthilmurugan M S, Chennai (IN); Krithika Gurumurthy, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 131 days.

(21) Appl. No.: 18/185,424

(22) Filed: Mar. 17, 2023

(65) Prior Publication Data

US 2024/0314418 A1 Sep. 19, 2024

(51) Int. Cl.
*G06T 7/80* (2017.01)
*G06T 7/62* (2017.01)

(52) U.S. Cl.
CPC .......... *G06T 7/80* (2017.01); *G06T 7/62* (2017.01); *G06T 2207/20116* (2013.01)

(58) Field of Classification Search
CPC .... G06T 5/70; G06T 7/60; G06T 7/62; G06T 7/66; G06T 7/80; G06T 2207/20116; H04N 1/00819; H04N 1/40012; H04N 23/55; H04N 23/633; H04N 23/635
See application file for complete search history.

(56) References Cited

U.S. PATENT DOCUMENTS

| | | | |
|---|---|---|---|
| 7,307,709 B2 | 12/2007 | Lin et al. | |
| 8,538,132 B2* | 9/2013 | Kessler | G06T 7/64 348/94 |
| 10,488,186 B2* | 11/2019 | Tuulos | H04N 23/55 |
| 2010/0053394 A1* | 3/2010 | Kinoshita | H04N 23/55 348/340 |

FOREIGN PATENT DOCUMENTS

| | | | | |
|---|---|---|---|---|
| CN | 114897994 | * | 8/2022 | |
| CN | 114897994 A | | 8/2022 | |
| CN | 113891068 | * | 9/2022 | |
| CN | 113891068 A | | 9/2022 | |
| EP | 3328048 B1 | | 4/2021 | |
| WO | WO-2014101281 A1 | * | 7/2014 | G01B 11/27 |

* cited by examiner

*Primary Examiner* — Daniel M Pasiewicz
(74) *Attorney, Agent, or Firm* — Jason C. Cameron

(57) ABSTRACT

A system for calculating a camera lens offset deviation is provided. The system includes a camera module configured to be enclosed within a translucent filter, a tracing module that traces a field of view in coverage of a camera lens, a threshold module that converts the grayscale image into a binary image, a dilation module that uses a translucent filter positioned in front of the camera lens for noise reduction, a contour module plots the high-intensity pixels in the threshold image, an extraction module extracts an external point of the lens image, a resolution generation module generates a resolution of a camera sensor and plots a reference line, a determination module determines a center of the circle using a fit ellipse, plots a plurality of deviation axis lines and compares them with the reference thereby obtaining the offset deviation, an alert module alerts the user about the lens offset deviation.

14 Claims, 5 Drawing Sheets

SYSTEM AND A METHOD FOR CALCULATING A CAMERA LENS OFFSET DEVIATION

FIELD OF INVENTION

Embodiments of a present disclosure relate to a technical field of calculation and more particularly to a system and a method for calculating a camera lens offset deviation.

BACKGROUND

Handheld electronic devices with integrated cameras are currently present in the consumer market. The integrated cameras consist of the lens assembly. The lens assemblies are composed of a number of lenses mounted for a particular imaging function. High-Resolution lenses are for machine vision, instrumentation, inspection, and vibration-sensitive applications. For a device having the lens assembly, the lens in the device may have an axis deviation due to a defect of the lens.

The lens assembly issues such as misalignment of lens and sensor may cause lens shading or vignetting in the image. It is very important that the camera lens must be aligned to the sensor center. If there is a deviation in center offset, during lens calibration, the adjustment of the lens focus to the object center may become difficult. This may eventually have a deviation in the camera lens focusing the target which may lead to misinterpreted results.

There is a need for a system that checks the sensor and lens center offset deviation. Also, there is a need for a system that calculates the lens offset deviation with high precision. Further, there is a need for a system that alerts the user on the lens offset deviation in pixels from the sensor center.

Hence, there is a need for a system and a method for calculating a camera lens offset deviation addresses the aforementioned issues.

BRIEF DESCRIPTION

In accordance with one embodiment of the disclosure a system for calculating a camera lens offset deviation is disclosed. The system includes a camera module, a tracing module, a threshold module, a dilation module, a counter module, an extraction module, a resolution generation module, a determination module, and an alert module. The camera module configured to be enclosed within a translucent filter. The camera module is placed at a predefined distance to capture an image. The tracing module operatively coupled with the camera module and configured to trace a field of view in coverage of a camera lens wherein the field of view is obtained by capturing an image. The captured image is converted into a grayscale image. The threshold module is operatively coupled with the tracing module. The threshold module is configured to convert the grayscale image into a binary image by partitioning the pixel intensity difference. The dilation module is operatively coupled with the tracing module. The dilation module is configured to use a translucent filter positioned in front of the camera lens for noise reduction. The contour module plots the high-intensity pixels in the threshold image. The extraction module extracts an external point of the lens image by applying a convex hull method, wherein the lens image is in a circle shape. The resolution generation module is configured to generate a resolution of a camera sensor and plots a reference line based on a resolution center. The determination module is operatively coupled with the extraction module and the resolution generation module. The determination module is configured to determine a center of the circle using a fit ellipse and plot a plurality of deviation axis lines, wherein the fit ellipse is a method of applying an inverse transform to the image circle resulting in getting the elliptical fit for the original image. The determination module is also configured to compare the reference line and the plurality of deviation axis lines thereby obtaining the offset deviation based on the pixel values. The alert module is operatively coupled to the determination module wherein the alert module is configured to alert the user about the lens offset deviation.

In accordance with another embodiment, a method for calculating a camera lens offset deviation is provided. The method includes capturing, by a tracing module, an image for obtaining a field of view, wherein a field of view is traced in the coverage of a camera lens and plots high contour points in the field of view of the camera lens. The method also includes converting, by the tracing module, the captured image into a grayscale image. Further, the method includes applying, by a dilation module, dilation to reduce a noise in the image by using, uses a translucent filter positioned in front of the camera lens for the removal of noise. Furthermore, the method includes extracting, by an extraction module, a circumference of the lens image circle by applying a convex hull method. Furthermore, the method includes generating, by a resolution generation module, a resolution of a camera sensor and plotting a reference line based on a resolution center. Furthermore, the method includes determining, by a determination module, a center of the circle using a fit ellipse and plotting a plurality of deviation axis lines. The fit ellipse is a method of applying an inverse transform to the image circle resulting in getting the elliptical fit for the original image. Furthermore, the method includes comparing, by the determination module, the reference line and the plurality of deviation axis lines to calculate the offset deviation. Furthermore, the method includes displaying, by the determination module, a result image and alerting a user about the lens offset deviation.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
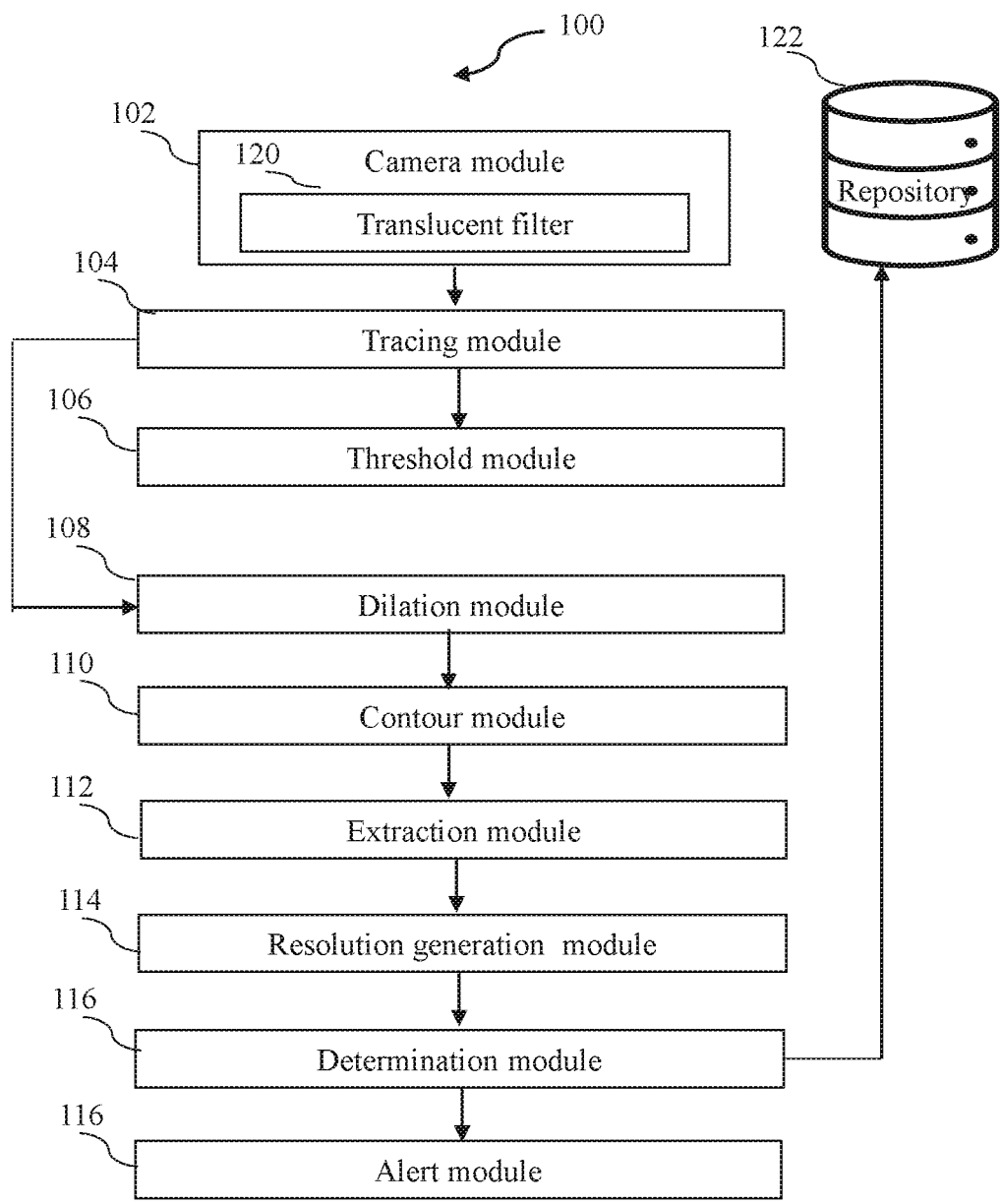
FIG. 1 is a block diagram representing a system for calculating a camera lens offset deviation in accordance with an embodiment of the present disclosure.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for calculating a camera lens offset deviation is disclosed. The system includes a camera module configured to be enclosed within a translucent filter. The camera module is placed at a predefined distance to capture an image. The system also includes a tracing module that is operatively coupled with the camera module and configured to trace a field of view in coverage of a camera lens wherein the field of view is obtained by capturing an image. The captured image is converted into a grayscale image. The system includes a threshold module that is operatively coupled with the tracing module. The threshold module is configured to convert the grayscale image into a binary image by partitioning the pixel intensity difference. A dilation module is operatively coupled with the tracing module. The dilation module is configured to use a translucent filter positioned in front of the camera lens for noise reduction. A counter module is the high-intensity pixels in the threshold image. The system includes an extraction module that extracts an external point of the lens image by applying a convex hull method. The lens image is in a circle shape, a resolution generation module is configured to generate a resolution of a camera sensor and plots a reference line based on a resolution center, a determination module is operatively coupled with the extraction module, and the resolution generation module, a determination module is configured to determine a center of the circle using a fit ellipse and plot a plurality of deviation axis lines. The fit ellipse is a method of applying an inverse transform to the image circle resulting in getting the elliptical fit for the original image. The determination module is also configured to compare the reference line and the plurality of deviation axis lines thereby obtaining the offset deviation based on the pixel values. The alert module is operatively coupled to the determination module wherein the alert module is configured to alert the user about the lens offset deviation. Further, the device described hereafter in FIG. 1 is the system for calculating a camera lens offset deviation.

FIG. 1 is a block diagram representing a system (100) for calculating a camera lens offset deviation in accordance with an embodiment of the present disclosure. The system (100) includes a camera module (102), a tracing module (104), a threshold module (106), a dilation module (108), a contour module (110), an extraction module (112), a resolution generation module (114), a determination module (116), and an alert module (118).

The camera module (102) is configured to be enclosed within a translucent filter (120). The camera module (102) is placed at a predefined distance to capture an image (not shown in FIG. 1). In one embodiment, the translucent filter (120) protects the camera lens and alters the characteristics of light passing through the lens.

The tracing module (104) is configured to trace a field of view (FOV) in the coverage of a camera lens. The field of view is obtained by capturing the image. The image, upon capturing, is converted into a grayscale image. In one embodiment, the image is captured in a dim light shot and at any preview.

The threshold module (106) is operatively coupled with the tracing module (104). The threshold module (106) is configured to convert the grayscale image into a binary image by partitioning the pixel intensity difference. In one embodiment, the binary image allows easy separation of an object from the background.

The dilation module (108) is operatively coupled with the tracing module (104). The dilation module (108) is configured to use a translucent filter (120) positioned in front of the camera lens for noise reduction. In one embodiment, the translucent filter (120) allows partial transmission of light rays.

The contour module (110) is operatively coupled with the threshold value, wherein plots the high-intensity pixels in the threshold image. In one embodiment, a gaussian blur is applied for contour reduction in the image. In another embodiment, the counter reduction is obtained by using an image processing technique. In one embodiment, the gaussian blur is a way to apply a low-pass filter in the image. The gaussian blur is used to remove random noise from the image. In another embodiment, in the gaussian blur, the average value of the surrounding pixel or neighbouring pixels replaces the noisy pixel present in the image.

The extraction module (112) is operatively coupled with the contour module (110) and extracts an external point of the lens image by applying a convex hull method, wherein the lens image is in a circle shape. In one embodiment, the lens image with the circle shape is generated by extracting the points in the plotted contour using external points of the plotted contour in the captured image by applying a convex hull method. In one embodiment, the convex hull may be defined either as the intersection of all convex sets containing a predefined set of all convex combinations of points.

The resolution generation module (114) is operatively coupled with the extraction module (112) configured to generate a resolution of a camera sensor and plots a reference line based on a resolution center. In one embodiment, the reference lines are vertical or horizontal lines in a graph, corresponding with user-defined values on the x-axis and y-axis respectively. In another embodiment, the reference lines are plotted in a graph, corresponding with user-defined values on the x-axis, y-axis, and z-axis.

The determination module (116) is operatively coupled with the extraction module (112) and the resolution generation module (114). The determination module (116) is configured to determine the center of the circle using a fit ellipse and plot a plurality of deviation axis lines. The fit ellipse is a method of applying an inverse transform to the image circle resulting in getting the elliptical fit for the original image. The determination module (116) is also configured to compare the reference line and the plurality of deviation axis lines thereby obtaining the offset deviation based on the pixel values. In one embodiment, the lens offset from the sensor is calculated with reference to the sensor center. In one embodiment, the determination module (116) allows a user to read the lens offset deviation for recognizing a tolerable deviation. In another embodiment, the deviation is calibrated automatically.

The alert module (118) is operatively coupled to the determination module (116). The alert module (118) is configured to alert the user about the lens offset deviation. It must be noted that the alert can be any suitable type for instance, Short Message Service (SMS), color code alerts, mobile push notifications and the like.

In one embodiment, the system (100) includes a repository (122) configured to store the calculated offset deviation for correction purposes before generating the resulting image. In one embodiment, the image is generated by comparing the calculated offset for the current image with the offset stored in the repository (122), this leads to high accuracy.

Figure 2:
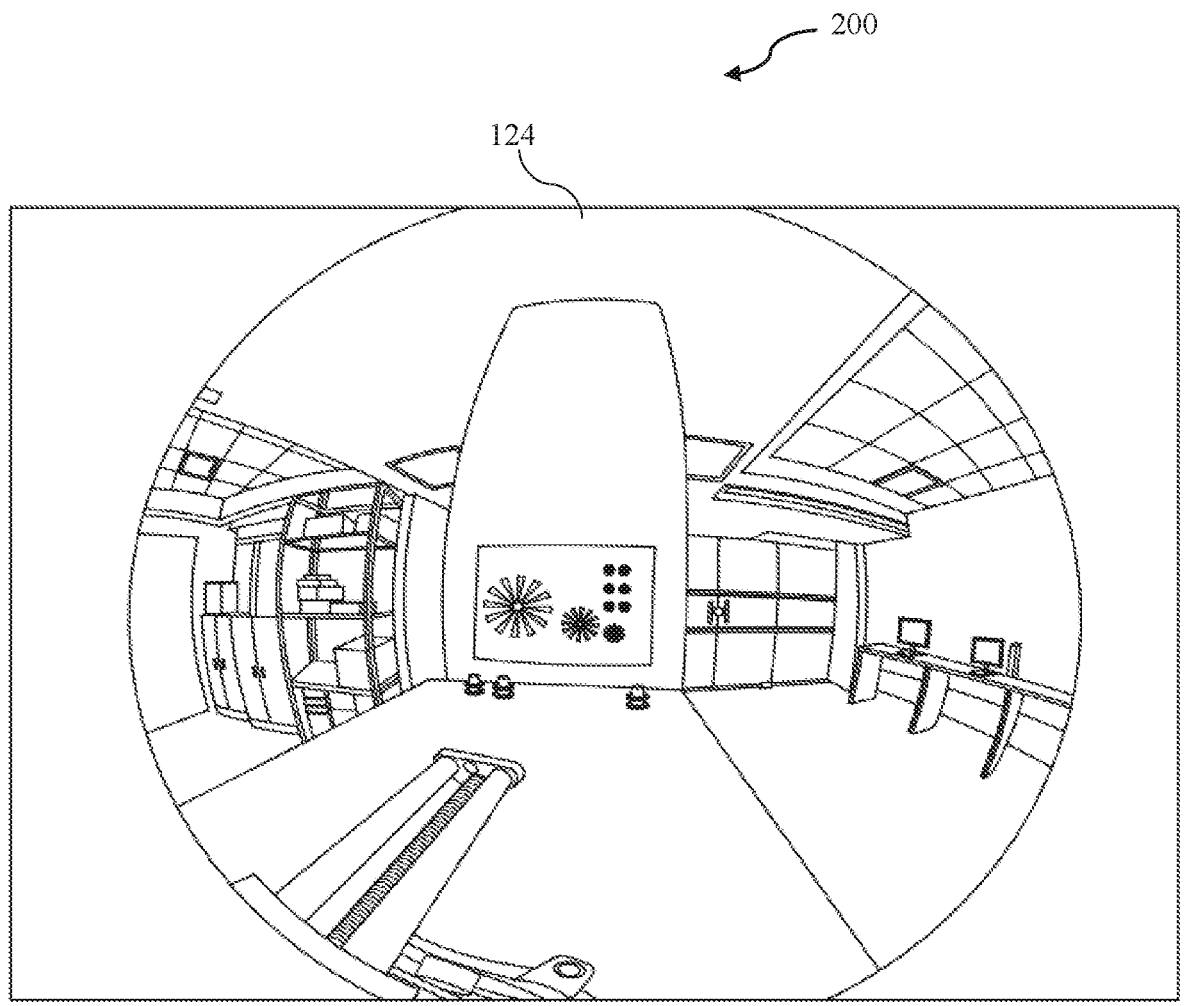
FIG. 2 is a schematic representation of an image used in a system for calculating the offset deviation of FIG. 1 in accordance with an embodiment of the present disclosure.
Figure 3:
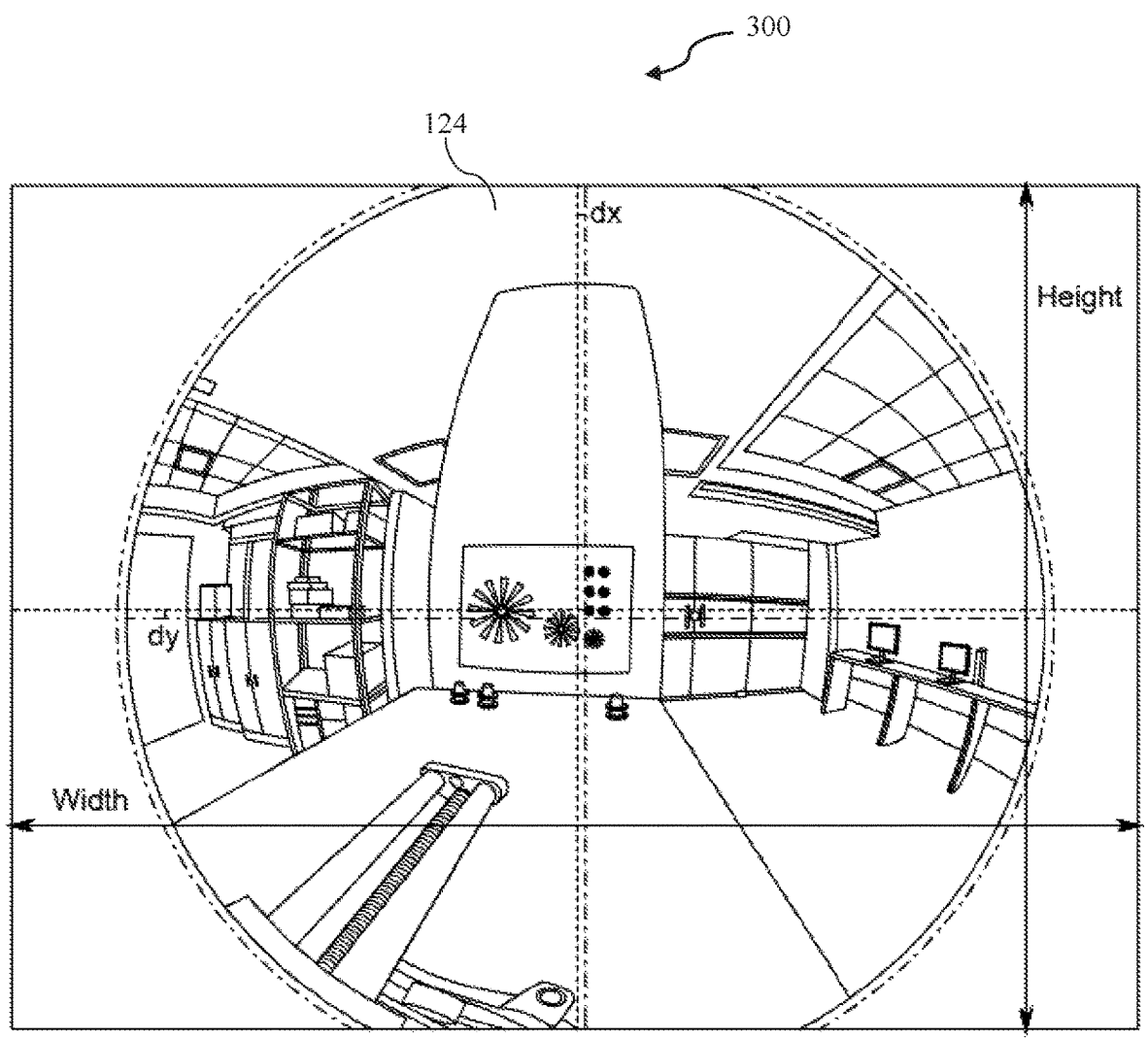
FIG. 3 is a schematic representation of a lens offset deviation for the image of FIG. 1 in accordance with an embodiment of the present disclosure.

FIG. 2 is a schematic representation of an image (124) used in a system (100) for calculating the offset deviation and FIG. 3 is a schematic representation of a lens offset deviation for image (124) of FIG. 1 in accordance with an embodiment of the present disclosure. In one embodiment, the working of the system (100) includes checking the sensor and lens center offset deviation and alerting a user on the lens offset deviation in pixels from the sensor center. This process obtains the sensor and lens center point. In the next step, keeping the sensor center as a reference, the lens offset from the sensor is calculated. After calculation, the calculated pixel deviation is displayed. The camera is focused before capturing the image (124). The image (124) may be captured at any preview without a flare light. The image (124) circle of the lens is necessarily fully covered by the sensor's active area as shown in FIG. 2.

In one embodiment, the position of the image center is at (960,540) with respect to x-axis and y-axis. In one embodiment, the position of lens center is (958,531). In one embodiment, if the dx is 2 is at pixels and dy is at 9 pixels then the output result may be correct.

Figure 4:
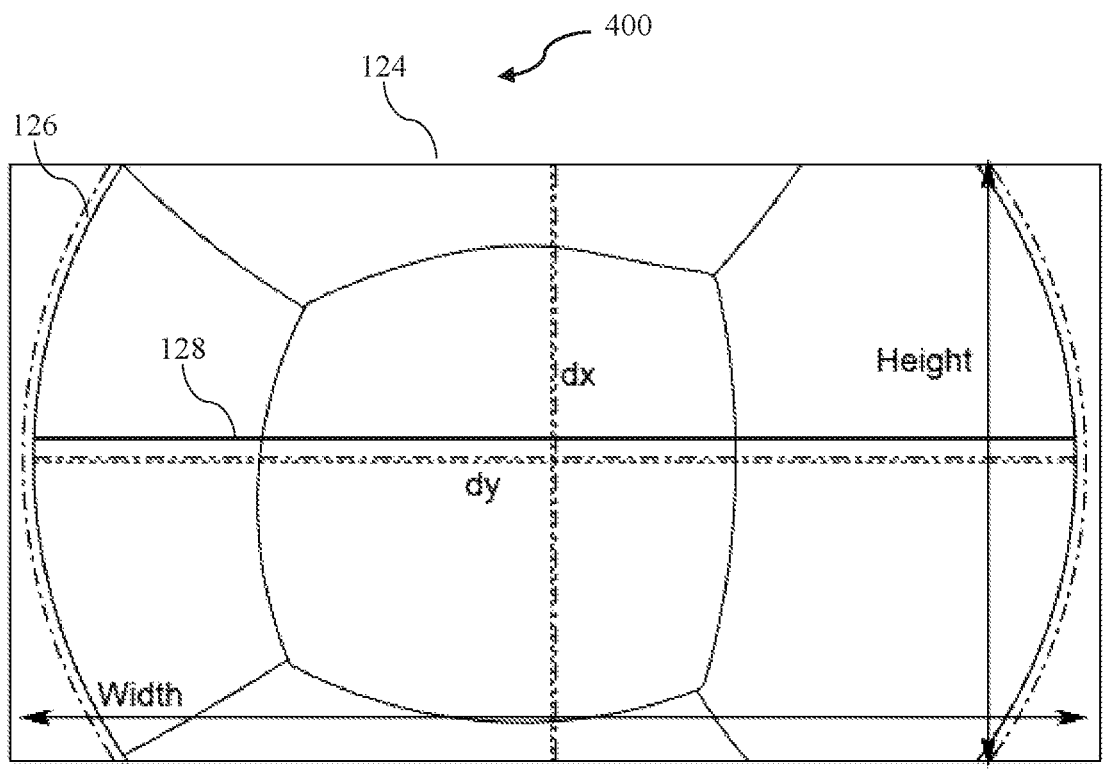
FIG. 4 is a schematic representation of the image obtained with noise removed from the image of FIG. 1 in accordance with an embodiment of the present disclosure.

FIG. 4 is a schematic representation of the image (124) obtained with noise removed from the image (124) of FIG. 1 in accordance with an embodiment of the present disclosure. The circle (126) and line (128) indicates the area covered by the lens. Likewise, the line (128) indicates the center of the lens. Further, the deviation between lens center and the sensor center is represented as dx and dy respectively in pixels. In one embodiment, the image (124) is obtained by using an optimized setup of the system (100). Also in another embodiment, the image (124) is obtained by an algorithm fine-tuning. In one embodiment, the algorithm fine-tuning is a process with the system which is already been trained for the noise reduction and then tunes or tweaks the system to make it perform a second similar task.

Figure 5:
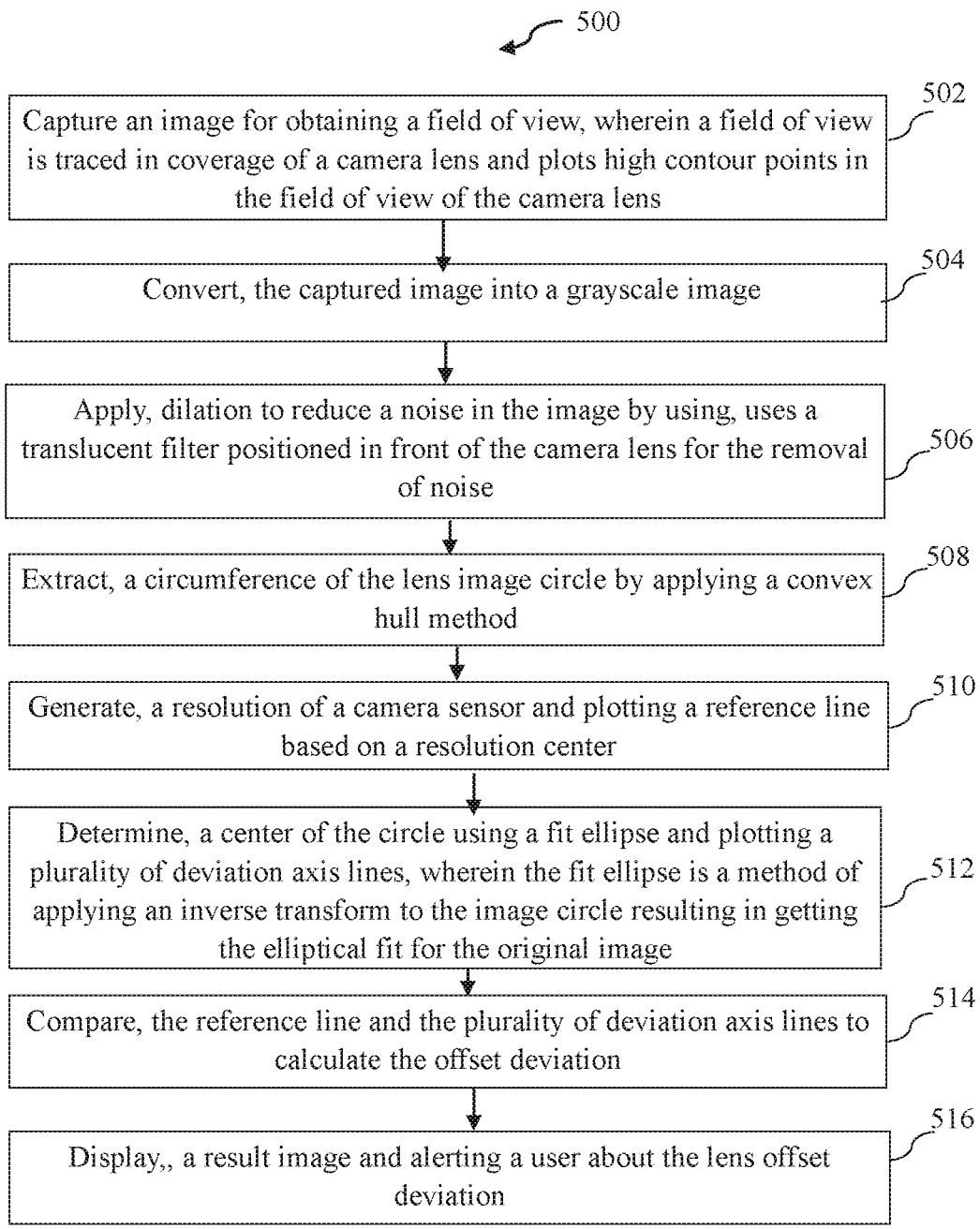
FIG. 5 is a flow chart representing steps involved in a method for calculating a lens offset deviation in accordance with an embodiment of the present disclosure.

FIG. 5 is a flow chart representing the steps involved in a method 500 for calculating a camera lens offset deviation. The method 500 includes capturing, by a tracing module, an image for obtaining a field of view, wherein a field of view is traced in coverage of a camera lens and plots high contour points in the field of view of the camera lens in step 502.

The method 500 also includes converting, by the tracing module, the captured image into a grayscale image in step 504. The grayscale image simplifies algorithms and eliminates the complexities related to computational requirements.

Further, the method 500 includes applying, by a dilation module, dilation to reduce a noise in the image by using a translucent filter positioned in front of the camera lens for the removal of noise in step 506. The method also includes reducing, a number of counters by applying a blurring technique, wherein the effect of the blurring technique is to average out rapid changes in pixel intensity. The method also includes applying, a threshold value to differentiate the lens circle from the image.

Furthermore, the method 500 includes extracting, by an extraction module, a circumference of the lens image circle by applying a convex hull method in step 508. The method also includes using, the convex hull, wherein the convex hull may be defined either as the intersection of all convex sets containing a predefined set of all convex combinations of points.

Furthermore, the method 500 includes generating, by a resolution generation module, a resolution of a camera sensor and plotting a reference line based on a resolution center in step 510. The method also includes a sensor center line, a lens center line, and a lens circle.

Furthermore, the method 500 includes determining, by a determination module, a center of the circle using a fit ellipse and plotting a plurality of deviation axis lines, wherein the fit ellipse is a method of applying an inverse transform to the image circle resulting in getting the elliptical fit for the original image in step 512.

Furthermore, the method 500 includes comparing, by the determination module, the reference line and the plurality of deviation axis lines to calculate the offset deviation in step 514.

Furthermore, the method 500 includes displaying, by the determination module, a result image and alerting a user about the lens offset deviation in step 516. The method also includes displaying, the resulting image comprising the position of the image centre, the position of the lens center, and the offset deviation.

Various embodiments of the present disclosure enable the calculation of lens offset deviation. The system in the present disclosure facilitates checking the sensor and lens center offset deviation. Also, the system in the present disclosure calculates the lens offset deviation with high precision. Further, the system alerts the user on the lens offset deviation in pixels from the sensor center.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for calculating a camera lens offset deviation comprises:
    a camera module configured to be enclosed within a translucent filter, wherein the camera module is placed at a predefined distance to capture an image;
    a tracing module configured to:
        a trace a field of view in coverage of a camera lens wherein the field of view is obtained by capturing an image and wherein the captured image is converted into a grayscale image;
    a threshold module operatively coupled with the tracing module, wherein the threshold module is configured to convert the grayscale image into a binary image by partitioning the pixel intensity difference;
    a dilation module operatively coupled with the tracing module, wherein the dilation module is configured to use a translucent filter positioned in front of the camera lens for noise reduction;
    a contour module plots the high-intensity pixels in the threshold image;
    an extraction module extracts an external point of the lens image by applying a convex hull method, wherein the lens image is in a circle shape;
    a resolution generation module configured to generate a resolution of a camera sensor and plots a reference line based on a resolution center;
    a determination module operatively coupled with the extraction module and the resolution generation module, wherein the determination module is configured to:
        determine a center of the circle using a fit ellipse and plot a plurality of deviation axis lines, wherein the fit ellipse is a method of applying an inverse transform to the image circle resulting in getting the elliptical fit for the original image;
        compare the reference line and the plurality of deviation axis lines thereby obtaining the offset deviation based on the pixel values; and
    an alert module operatively coupled to the determination module wherein the alert module is configured to alert the user about the lens offset deviation.

2. The system according to claim 1, wherein the lens image with the circle shape is generated by extracting the points in the plotted contour using external points of the plotted contour in the captured image by applying a convex hull method.

3. The system according to claim 1, wherein a gaussian blur is applied for contour reduction in the image.

4. The system according to claim 1, wherein the counter reduction is obtained by using an image processing technique.

5. The system according to claim 1, wherein the image is captured in a dim light shot and at any preview.

6. The system according to claim 1, wherein the lens offset from the sensor is calculated with reference to the sensor center.

7. The system according to claim 1, wherein the determination module allows a user to read the lens offset deviation for recognizing a tolerable deviation.

8. The system according to claim 1, wherein the deviation is calibrated automatically.

9. The system according to claim 1, comprises a repository configured to store the calculated offset deviation for correction purposes before generating the result image.

10. A method for calculating a camera lens offset deviation comprises:
    capturing, by a tracing module, an image for obtaining a field of view, wherein a field of view is traced in coverage of a camera lens and plots high contour points in the field of view of the camera lens;
    converting, by the tracing module, the captured image into a grayscale image;
    applying, by a dilation module, dilation to reduce a noise in the image by using, uses a translucent filter positioned in front of the camera lens for the removal of noise;
    extracting, by an extraction module, a circumference of the lens image circle by applying a convex hull method;
    generating, by a resolution generation module, a resolution of a camera sensor and plotting a reference line based on a resolution center;
    determining, by a determination module, a center of the circle using a fit ellipse and plotting a plurality of deviation axis lines, wherein the fit ellipse is a method of applying an inverse transform to the image circle resulting in getting the elliptical fit for the original image;
    comparing, by the determination module, the reference line and the plurality of deviation axis lines to calculate the offset deviation; and
    displaying, by the determination module, a result image and alerting a user about the lens offset deviation.

11. The method according to claim 10, comprises reducing, a number of counters by applying a blurring technique, wherein the effect of the blurring technique is to average out rapid changes in pixel intensity.

12. The method according to claim 10, comprises displaying, the resulting image comprising the position of the image centre, the position of the lens center, and the offset deviation.

13. The method according to claim 10, comprises drawing, a sensor center line, a lens center line, and a lens circle.

14. The method according to claim 10, comprises applying, a threshold value to differentiate the lens circle from the image.

* * * * *